United States Patent [19]

Lawandy

[11] Patent Number: 5,233,621
[45] Date of Patent: Aug. 3, 1993

[54] SECOND HARMONIC GENERATION AND SELF FREQUENCY DOUBLING LASER MATERIALS COMPRISED OF BULK GERMANOSILICATE AND ALUMINOSILICATE GLASSES

[75] Inventor: Nabil M. Lawandy, Providence, R.I.

[73] Assignee: Intellectual Property Development Associates of Connecticut, Inc., Trumbull, Conn. ; a part interest

[21] Appl. No.: 958,960

[22] Filed: Oct. 9, 1992

Related U.S. Application Data

[62] Division of Ser. No. 722,345, Jun. 27, 1991, Pat. No. 5,157,674.

[51] Int. Cl.⁵ ............................................. H01S 3/10
[52] U.S. Cl. ..................................... 372/22; 372/40; 369/145; 385/141
[58] Field of Search ................. 372/40, 21, 22, 68, 372/39; 385/141, 122; 359/328, 145

[56] References Cited

U.S. PATENT DOCUMENTS

| | | |
|---|---|---|
| 4,335,934 | 6/1982 | Black et al. |
| 4,339,173 | 7/1982 | Aggarwal et al. |
| 4,385,802 | 5/1983 | Blaszyk et al. |
| 4,428,646 | 1/1984 | Lighty |
| 4,431,263 | 2/1984 | Garito |
| 4,478,623 | 10/1984 | Olshansky |
| 4,536,450 | 8/1985 | Garito |
| 4,755,215 | 10/1988 | Teng et al. |
| 4,756,598 | 7/1988 | Gerbi et al. |
| 4,763,019 | 8/1988 | Duguay et al. |
| 4,770,494 | 9/1988 | Csencsits et al. |
| 4,804,247 | 2/1989 | Kyoto et al. |
| 4,822,399 | 4/1989 | Kanamori et al. |
| 4,826,283 | 5/1989 | Chuangtian et al. |
| 4,861,129 | 8/1989 | Che et al. |
| 4,865,406 | 9/1989 | Khanarian et al. |
| 4,867,510 | 9/1989 | Dobson |
| 4,892,375 | 1/1990 | Chikuma et al. |
| 5,157,674 | 10/1992 | Lawandy ..................... 372/22 |

OTHER PUBLICATIONS

"Dye Laser Pumped by Nd:YAG Laser Pulses Frequency Doubled in A Glass Optical Fiber", U. Osterberg et al., 1986 Optical Society of America.

"Frequency Doubling of 1.319 μm Radiation in an Optical Fibre by Optically Written $\chi^{(2)}$ Grating", M. C. Farries et al.

"Tunable Second Order Susceptibility Gratings for Harmonic Generation in Optical Fibres", M. C. Farries et al., Optical Fibre Group, University of Southampton.

"Efficient Second Harmonic Generation in an Optical Fibre" IEEE Col. on Nonlinear Optical Waveguides, London, Jun. 1988.

(List continued on next page.)

Primary Examiner—Léon Scott, Jr.

[57] ABSTRACT

A method for preparing a material so as to exhibit second harmonic generation for optical radiation that passes through the material. The method includes a first step of providing a bulk glass comprised of substitutionally doped silica and a charge transfer dopant. The bulk glass is prepared for frequency doubling in accordance with a method that includes a step of irradiating the bulk glass with optical radiation having a first wavelength and a second wavelength, the bulk glass being irradiated for a period of time sufficient to obtain a desired amount of conversion efficiency of the first wavelength into the second wavelength. The silica is substitutionally doped with an element selected from the group consisting of Ge and Al, and the charge transfer dopant is selected from the group consisting of $Ce^{3+}$, $Nd^{3+}$, and $Eu^{2+}$. In another embodiment of the invention the silica is substitutionally doped with Ge and the charge transfer dopant is comprised of naturally existing Ge defects. The bulk glass may be provided as a monolithic body, a preform, a coating, a layer, or as a film. Optical devices incorporating a bulk glass SHG converter and self-frequency doubling glass lasers are described.

12 Claims, 2 Drawing Sheets

OTHER PUBLICATIONS

Optics Communications, vol. 77, No. 4, Jul. 1990, Amsterdam NL pp. 339-342, XP135908 N. Lawandy "Observation of Seeded Second Harmonic . . . ".

Conference on Quantum Electronics Laser Science 1991 TEC. Digest Series vol. 11, May 1991, Baltimore, Md. pp. 50-51 McDonald "Optically Encoded Second . . . ".

Conference on Quantum Electronics Laser Science 1991 Tech. Digest Series vol. 11, May 1991, Baltimore, Md. pp. 49-50, V. Churikov "Gratings in Bulk Glass . . . ".

Optics Communications vol. 81, No. 1/2, Feb. 1991, Amsterdam NL pp. 38-42, M. D. Selker "Preparation Intensity Dependence". . . .

Electronics Letters vol. 25, No. 3, Feb. 1989, pp. 206--2-8, R. Kashyap "Second Harmonic Generation in GeO2 Waveguide".

XVII Int. Conf. on Quantum Electronics, May 1990, Anaheim, Calif. pp. 14-15, R. Astier "Second Harmonic Generation In . . . ".

Applied Physics Letters, vol. 51, No. 10, Sep. 1987, New York, pp. 722-724, B. Valk "Second Harm Generation In . . . ".

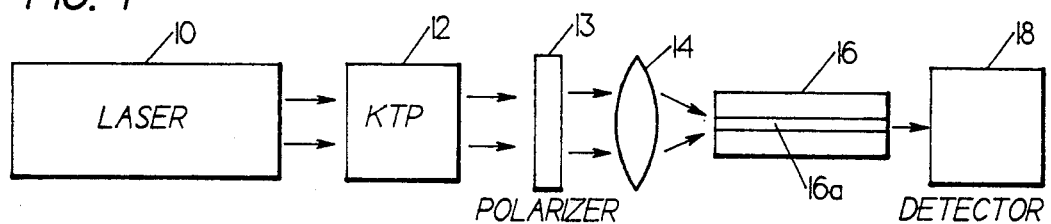
FIG. 1
FIG. 2
Prior Art
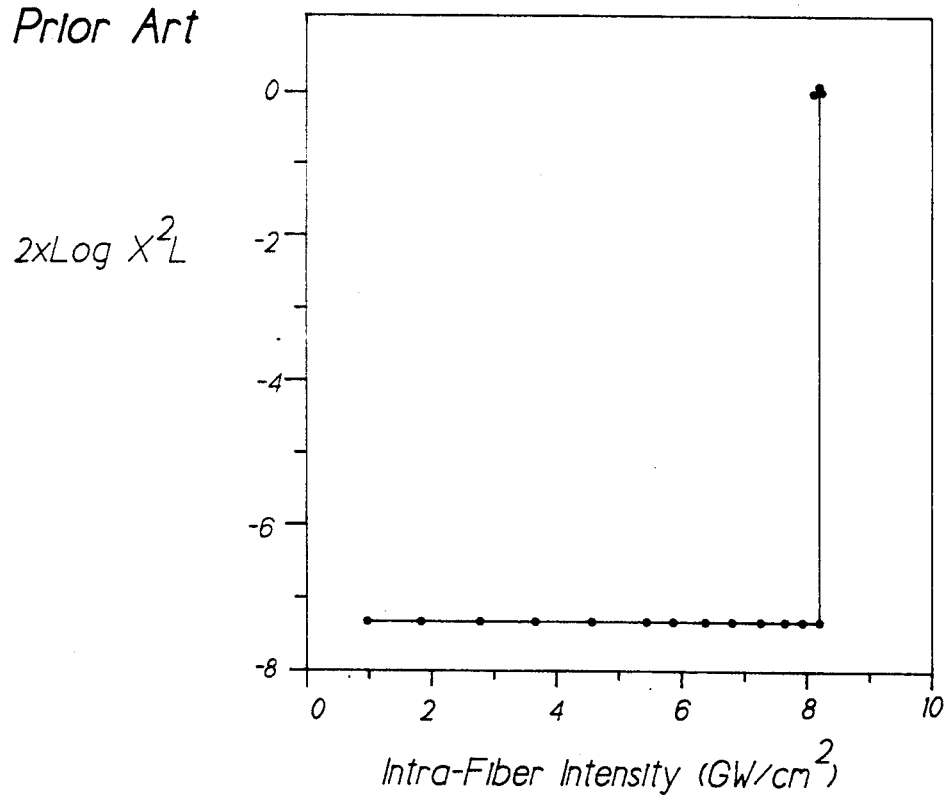
$2 \times Log \, X^2 L$
Intra-Fiber Intensity ($GW/cm^2$)
FIG. 3
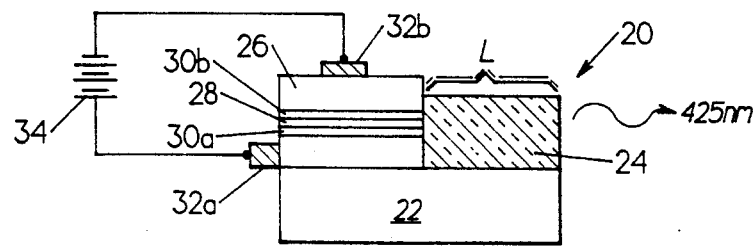

SECOND HARMONIC GENERATION AND SELF FREQUENCY DOUBLING LASER MATERIALS COMPRISED OF BULK GERMANOSILICATE AND ALUMINOSILICATE GLASSES

This is a divisional of copending application Ser. No. 07/722,345 filed on Jun. 27, 1991 (U.S. Pat. No. 5,157,674).

FIELD OF THE INVENTION

This invention relates generally to optical second harmonic generation and, in particular, to second harmonic generation in a glass material.

BACKGROUND OF THE INVENTION

The combination of high power lasers and the efficient confinement of radiation over long lengths available in optical fibers has led to the observation of a variety of nonlinear optical effects. These effects include four-photon processes, stimulated Raman scattering, self-phase modulation and third harmonic generation. These effects are all mediated via the third order susceptibility and are to be expected for centrosymmetric media such as silica-based glasses.

In 1982, Sasaki and Ohmori observed that the injection of intense pulses from a Q-switched and mode-locked Nd:YAG laser into a germanium doped fiber resulted in an unexpectedly large amount of second harmonic generation [S. Sasaki and S. Ohmori, J. Opt. Comm. 43 (1983) 83, and S. Sasaki and S. Ohmori, IEEE QU-18 (1982) 758]. Measurements indicated a conversion efficiency of $10^{-3}$, a value that is approximately seven orders of magnitude larger than what is expected from interface and bulk contributions [R. W. Terhune and D. A. Weinberger, J. Opt. Soc. Am B4 (1987) 661]. More recently, Osterberg and Margulis reported that the injection of 1.06 μm pulses into a germanosilicate fiber, co-doped with phosphorus, developed a 5% conversion efficiency over a period of twelve hours [U. Osterberg and W. Margulis, Optics Lett. 11 (1986) 516]. Subsequently, a polarization preserving Ge and P doped fiber has been reported to exhibit a 13% second harmonic conversion efficiency [M. C. Farries, Nonlinear Guided Wave Phenomena: Physics and Applications, 1989 Houston Technical Proceedings, p. 246].

Stolen and Tom reported that the process of fiber preparation could be greatly accelerated if the fibers were simultaneously exposed to both the fundamental and the second harmonic [R. A. Stolen and H. W. K. Tom, Optics Lett. 12 (1988) 584]. These experiments demonstrated that fibers with only Ge as a dopant could be prepared in minutes using this technique, now referred to as seeded preparation. Recently, it has been shown that seeded preparation requires that the fundamental and second harmonic pulses be temporarily coincident, ruling out simple two-photon excitation schemes [M. D. Selker and N. M. Lawandy, OSA Annual Meeting, Orlando FL, 1989, paper Pd-21]. In addition, experiments on seeded preparation at 77K and 300K revealed no measurable changes in the fiber preparation, indicating that electronic hopping transport does not play a significant role in the process [M. D. Selker and N. M. Lawandy, Electron Lett. 25 (1989) 1440].

However, an efficient second harmonic generation effect has been reported to occur only in drawn fibers. Recent reports correlating self-preparation results with fiber drawing conditions have shown that high drawing tensions result in essentially no second harmonic generation [T. F. Carruthers, C. G. Askins and E. J. Friebel, OSA Annual Meeting, Orlando, FL, 1989, paper FX4]. This behavior has been attributed to the lack of drawing induced defects in the low tension cases. A model developed by Chen attributes the threshold intensity required at the fundamental to the competition of bulk and interface effects [Y. Chen, App. Phys. Lett 54 (1989) 1195]. However, despite these advances in preparing optical fibers to exhibit second harmonic generation (SHG), heretofore there has been no reported SHG in a bulk silica-based glass, such as a bulk germanosilicate preform of the type from which optical fibers are drawn.

SUMMARY OF THE INVENTION

In accordance with a method of the invention there is described a method for preparing a material so as to exhibit second harmonic generation for optical radiation that passes through the material. The method includes a first step of providing a bulk glass comprised of silica with germanium (germanosilicate) or aluminum (aluminosilicate), the bulk glass further including a charge transfer ion source. The source may be, by example, one or more elements selected from the group including $Ce^{3+}$, $Nd^{3+}$, and $Eu^{2+}$. The source may also be Ge defects in the bulk germanosilicate glass. The bulk glass may include phosphorous to stabilize the charge pinning required to produce an internal DC field. The method includes a second step of irradiating the bulk glass with optical radiation having a first wavelength and a second wavelength, and a power at least of the order of approximately 1 $GW/cm^2$. The step of irradiating occurs for a period of time sufficient to obtain a desired amount of conversion efficiency of the first wavelength into the second wavelength. By example, the first wavelength is 1.06 μm and the second wavelength is its exact second harmonic of 532 nm.

The bulk glass may be a monolithic structure, or a preform of the type used to produce optical fibers. The bulk glass may also be provided as a coating, film, or layer that is preferably fabricated through a metal-organic chemical vapor deposition (MOCVD) technique, a vapor assisted deposition (VAD) technique, or an equivalent technique.

In accordance with an example that described the preparation of a germanosilicate preform doped with 3% Ge and 0.5% P, measurements indicate that an increase of $10^5$ over an initial background SHG occurs with a power input of at least approximately 5 $GW/cm^2$. A value of $2 \times 10^{-7}$ was obtained for the conversion efficiency.

The teaching of the invention applies to bulk glasses including preforms, coatings, films, and layers of silica doped with Ge or Al, and a secondary dopant comprised of $Ce^{3+}$, $Nd^{3+}$, $Eu^{2+}$ and/or naturally existing Ge defects. The bulk glass may also be codoped with P. By example, the silica-based coating is doped with 3% Ge and 0.5% P. The coating is preferably applied by MOCVD, VAD or equivalent methods. The invention also applies to coatings, films, and layers of silica doped with, by example, 2% Ge and $10^{+2}$% Nd.

The teaching of the invention encompasses glasses including [$SiO_2$:Al/$Ce^{3+}$], [$SiO_2$:Al/$Eu^{2+}$], [$SiO_2$:Ge/$Ce^{3+}$], [$SiO_2$:Ge/$Nd^{3+}$] and [$SiO_2$:Ge/Ge defect]. The teaching of the invention also encompasses glasses including [$SiO_2$:$Ce^{3+}$], [$SiO_2$:$Eu^{2+}$], and [$SiO_2$:$Nd^{3+}$].

Further in accordance with the invention embodiments are disclosed of optical devices that employ a bulk glass SHG frequency doubler. By example, a semiconductor laser diode is provided at an output with a layer of germanosilicate glass that is doped with 3% Ge and 0.5% P. The layer is initially prepared in accordance with the method of the invention so as to convert the laser output of 1.06 μm to 532 nm.

Further in accordance with the invention there is disclosed a glass laser rod that exhibits intracavity second harmonic generation and that eliminates a requirement for a separate optical component, such as a frequency doubling crystal, to obtain a frequency doubled optical output from a laser. A method of preparing the glass laser rod for second harmonic generation is also described.

BRIEF DESCRIPTION OF THE DRAWING

FIG. 1 is a simplified block diagram showing apparatus for preparing bulk germanosilicate glass for Second Harmonic Generation;

FIG. 2 is a graph of a log of a normalized susceptibility length plotted versus an intra-fiber intensity for a 4 μm core diameter germanium doped optical fiber;

FIG. 3 is a cross sectional view of an optical device that includes a laser diode and an optical wavelength second harmonic generator that is coupled to an output of the laser diode for converting the infrared output of the laser diode to green light;

DETAILED DESCRIPTION OF THE INVENTION

Figure 4:
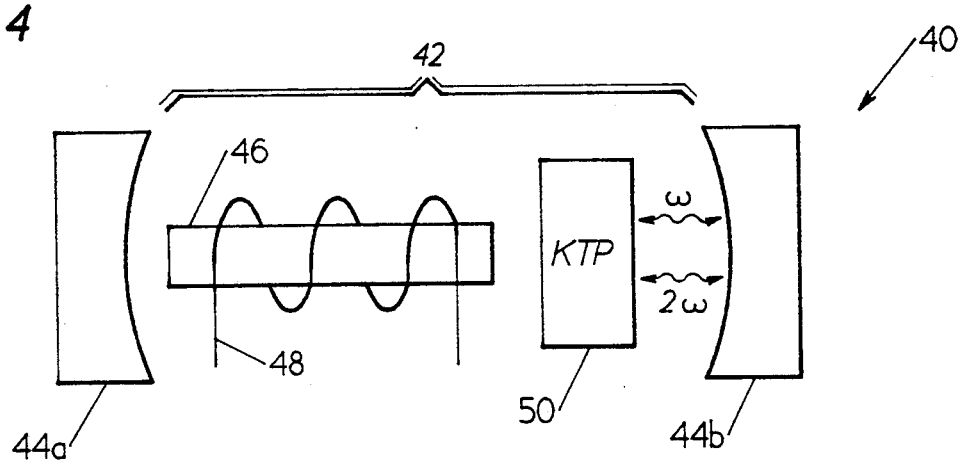
FIG. 4 is a simplified block diagram showing apparatus for preparing a frequency doubling glass laser rod.

Experimental work on the seeded preparation optical fibers has shown that a critical Infrared (IR) intensity of the order of GW/cm2 exists for the evolution of efficient second harmonic generation in germanosilicate fibers. This value of intensity requires peak pulse powers of the order of from several hundred watts to kilowatts, depending on the fiber composition and core diameter. Such intensities are readily available from modelocked and Q-switched lasers and have been successfully employed to prepare fibers.

In order to achieve the required intensities in bulk preform materials peak powers in the hundreds of kilowatts to a megawatt are required, owing to the loss of energy confinement that is inherently available in guiding fibers.

As employed herein a bulk glass may be provided as a monolithic body, a preform, a coating, a layer, or as a film. The term "bulk glass" is intended herein to encompass all forms and structures of a glass, and to exclude glass fibers of the type that are drawn from a preform comprised of a bulk glass.

EXAMPLE

Reference is made to FIG. 1 for showing optical components employed to seed a bulk preform material so as to elicit second harmonic generation therefrom. A Q-switched and modelocked Nd:YAG laser 10 was operated at 1.06 μm and was capable of generating peak pulse powers of several megawatts. The laser output was frequency doubled in a potassium-titanyl(II)-phosphate (KTP) crystal 12 and produced pulses at 532 nm which had peak powers in the 100 kW range. The laser was operated with a modelocking frequency of 76 MHz and a Q-switched rate of 1 kHz. The laser pulses had widths of 110 ps and 80 ps at 1.06 μm and 532 nm, respectively.

A linear polarizer 13 was employed to polarize pulses from the laser 10. The linearly polarized pulses were focused using a 10 cm focal length lens 14 into a 2 cm long piece of preform 16, the preform having a germanium and phosphorous doped core 16a. The core molar composition was 3% Ge and 0.5% P doped silica and was manufactured by conventional MOCVD methods. The focal spot was 90 μm in diameter and was focused into the center of the preform core 16a, which was 1.5 mm in diameter.

Experiments were performed to measure the conversion efficiency in the preform 16 after each of several thirty minute exposures to a fixed 532 nm having an average power of 100 mW, with the IR intensity increased for each 30 minute exposure. The results showed that no increase in Second Harmonic Generation, above the initial background value, could be observed up to 4.5 W of average IR power. However, when the IR power was further increased to 6.25 W, the preform 16 prepared such that IR injection resulted in a clearly visible green spot that was observable in room lights. Measurements with a phase sensitive detection system 18 indicated that an increase of $10^5$ over the initial background SHG had occurred. Based on the measured signal intensity and a calibration obtained by directly illuminating the detection system with low intensity 532 nm output from the modelocked Q-switched laser, a value of $2 \times 10^{-7}$ was obtained for the conversion efficiency.

In order to estimate the susceptibility, an estimate of the phase matched grating length was made. Previous studies of the IR intensity threshold behavior of the seeded preparation process in a number of fibers have shown that the effect exhibits a critical type of behavior within a narrow range of intensities. FIG. 2 shows, for an optical fiber, the observed dependence of the second harmonic susceptibility obtained as a function of the IR input intensity. These experiments were performed in a 4 μm core fiber with cw modelocked operation of the laser, holding the 532 nm seed radiation constant at 0.8 mW of average input power.

Using the 5% range of IR power required to prepare the fiber it was estimated that, under the focusing conditions of FIG. 1, 0.5 mm of the preform 16 was prepared. The value of the conversion efficiency, along with the ~100 mm spot size, and the length of the preform 16 over which the critical intensity is exceeded, results in an effective second order susceptibility ($\chi^{(2)}$) value of $1.2 \times 10^{-16}$ m/V.

In order to directly compare the prepared preform susceptibility value to drawn fibers, two fibers drawn from the same preform 16 were prepared. The fibers were drawn at a slow (~13 m/s) and a conventional drawing rate (~40 m/s). The two fibers had 7.6 μm and 9 μm core diameters, respectively. Both fibers had a length of 50 cm and were prepared using cw modelocked operation of the Nd:YAG laser 10 with average powers of 6 W, and IR and green powers of 8 mW, respectively, coupled into the $LP_{01}$ mode. The fiber which was drawn slowly resulted in a $\chi(2)$ L product of $5.25 \times 10^{-17}$ m$^2$/V while the conventional drawing rate fiber gave a $\chi^{(2)}$L product of $3.8 \times 10^{-17}$ m$^2$/V. Assuming that the full length of the fiber was phase matched, these measurements give $\chi^{(2)}$ values of approximately $1 \times 10^{-16}$ m$^2$/V and approximately $7.6 \times 10^{-17}$ m/V for the slow and fast drawing rate fibers, respectively. These values indicate that there may be a larger population of the source of the nonlinear susceptibility in the preform 16, which is subsequently degraded by the fiber drawing process.

A further experiment was performed with a polished preform in order to attempt to self-prepare the material. The results of IR irradiation at peak intensities, which were three to five times higher than in seeded preparation experiments, for periods as long as sixteen hours, resulted in no preparation. This result indicates that in the absence of external seeding, the core-cladding interface contribution of the preform 16 to the second harmonic may be required to initiate the process of self-preparation.

Finally, an experiment was performed to spatially map the SHG effect across the preform 16 core region 16a. The results showed that the SHG was as much as 50 times larger at the edges of the core region 16a, as compared to the center of the core region 16a where there was measured a conversion efficiency of $2 \times 10^{-7}$. This indicates that longer heating of the material, along with the presence at the outer edges of H$_2$ during fabrication, enhances the SHG effect. The end result is a $10^{-5}$ conversion efficiency for this bulk glass.

In summary, a bulk preform 16 manufactured by the MOCVD process is found to exhibit quasiphase matched second harmonic generation when the preform 16 is conditioned using a seeded preparation technique. The second harmonic output from the preform 16 is clearly visible in room lights and corresponds to an effective second order susceptibility ($\chi(2)$) of approximately $1.2 \times 10^{-16}$ m/V. A critical IR intensity of approximately 1 GW/cm$^2$ to approximately 10 GW/cm$^2$ is required for preparation to occur in the preform 16. This is the same threshold observed in fibers and is consistent with optically induced charge delocalization models.

It is believed that SHG in the preform 16 results from the existence of defects such as Ge$_2^{(0)}$, Ge(E') centers and oxygen deficient sites such as ≡GE-Si≡ or ≡Ge-Ge≡. These oxygen deficient centers are believed to be formed during the chemical deposition of the preform 16 by the combustion of SiH$_4$, SiCl$_4$, or other precursors.

A most likely mechanism for producing SHG in the bulk glass is believed to depend on two factors. These factors are (1) the presence of a substitutional element in the silica glass network in combination with (2) the presence of a charge transfer dopant or source.

In order to provide the first factor, the Si in the silica glass network is substitutionally doped with a few Mol % (1-10%) of a more electronegative element, such as Al or Ge.

The second factor requires that a charge transfer system be incorporated into the modified silica glass network of (1). This is accomplished by doping with, for example, Ce$^{3+}$, Eu$^{2+}$, Nd$^{3+}$ or, as in the case of Ge-doped glass, naturally occurring defects. The dopants are present at concentrations of at least approximately 10 ppm to realize reasonable SHG effects.

Thus, the teaching of the invention encompasses glasses such as [SiO$_2$:Al/Ce$^{3+}$], [SiO$_2$:Al/Eu$^{2+}$], [SiO$_2$:Ge/Ce$^{3+}$], [SiO$_2$:Ge/Nd$^{3+}$] and [SiO$_2$:Ge/Ge defect].

It is also believed that SiO$_2$ glass in combination with a charge transfer dopant or source will produce SHG. For example, the teaching of the invention also encompasses glasses including [SiO$_2$:Ce$^{3+}$], [SiO$_2$:Eu$^{2+}$], and [SiO$_2$:Nd$^{3+}$].

In addition, it may be desirable to incorporate a low percent of phosphorous into the glass, as phosphorous has been found to stabilize the charge pinning required to produce the internal d.c. field producing the effective $\chi^{(2)}$.

Referring to FIG. 3 there is shown in cross-section an optical device 20 that includes a substrate 22 and a frequency doubler 24. The frequency doubler 24 is comprised of a glass of the type described above. Device 20 includes, by example, a semiconductor diode laser 26 positioned for rediating the frequency doubler 24. Laser 26 may be of conventional construction having an active region 28 that is bounded by cladding layers 30a and 30b. A pair of electrodes 32a and 32b are provided for coupling the laser diode 26 to a source of power, schematically shown as a battery 34. The semiconductor laser diode 26 has an output wavelength of 850 nm. In accordance with the invention the frequency doubler 24 is prepared as described above so as to generate 425 nm radiation from the input 850 nm.

Preferably, SHG 24 is deposited as a film or coating upon the substrate 22 by a MOCVD or equivalent technique. However, the frequency doubler 24 may be bonded to the substrate by an epoxy or any suitable adhesive. In like manner, the substrate 22 may be a substrate that the laser diode 26 is fabricated upon, or the laser diode 26 may be attached to the substrate by an epoxy or any suitable adhesive. The total length L of the frequency doubler 24 need not be any longer than an amount of the bulk glass that is prepared for SHG by the above described method. For example, L may be equal to approximately 0.5 mm. The frequency doubler 24 may be prepared, after deposition, by irradiating the face of the frequency doubler 24 that is opposite the output face of the laser. The irradiation of the frequency doubler 24 can be accomplished with a system as seen in FIG. 1. If the frequency doubler 24 is otherwise attached to the substrate 22, the frequency doubler 24 may be prepared as in FIG. 1 and then subsequently bonded to the substrate 22.

The optical device 20 thus includes a SHG wavelength converter of small size and high efficiency for converting the near IR output of the diode 26 to blue green light. One application for such a device is in optical data storage readout systems wherein it is desirable to minimize the optical wavelength so as to increase the bit packing density of the media.

A further embodiment of the invention will now be described in reference to FIGS. 4 and 5.

As was previously described, laser material is used to generate coherent light and a second material, for example KTP or the SHG glasses of the instant invention, is used to double the frequency of the coherent light.

It can be realized that the provision of SHG in bulk glasses, made possible by the invention, further enables the use of the same laser material, specifically the laser rod, to generate a fundamental wavelength and to also generate a frequency doubled wavelength.

By example, a common and most useful glass laser is Nd:Glass, where Nd is doped at 1-5 wt % into a base glass with, for example, 66 wt % SiO$_2$, 16 wt % Na$_2$O, 5% BaO, 2 wt % Al₂O₃ and 1 wt % Sb₂O₃. In this regard reference is made to E. Switzer and C. G Young "Glass Lasers" in Lasers Vol. 2, A. K. Levine ed., Marcel Dekker Inc., NY (1968) p. 191.

One recipe of interest herein includes Nd, or any other well known laser-ion such as $Tm^{3+}$, $Er^{3+}$, $Nd^{3+}$, $Yb^{3+}$, or $Ho^{3+}$, in a silica-base glass substitutionally doped with Al. This composition provides a laser rod which conforms to the first factor described previously. To provide the second factor, there is incorporated into the melt a charge transfer dopant such as, by example, $Ce^{3+}$ or $Eu^{2+}$. The resulting glass rod may then be prepared for SHG. In accordance with an aspect of the invention, a Nd-based glass laser rod having, for example, 500 ppm of $Ce^{3+}$ or $Eu^{2+}$, will lase and will also, if properly prepared, provide intracavity SHG.

Such a laser/doubler may be prepared as follows.

Referring to FIG. 4 there is illustrated a laser rod preparation system 40 that includes a laser cavity 42 bounded by reflective mirrors 44a and 44b. A laser rod 46 to be prepared for SHG is installed in the cavity 42 and is optically coupled to a flashlamp 48. An optical frequency doubling component, such as a KTP crystal 50, is provided within the cavity 42. Mirror 44a is 100% reflective at the fundamental wavelength (ω) and mirror 44b is 100% reflective at ω and 2ω. By example, the fundamental wavelength is 1.06 μm and the harmonic is 532 nm.

The laser rod 46 is pumped by the flashlamp 48 and operated for a period of time of from several minutes to several hours with the KTP crystal 50. This produces a large ω field and a 2ω field and prepares the laser/doubler for SHG in a manner similar to the injected 1.06 μm and 532 nm used to prepare the preform 16 of FIG. 1.

Figure 5:
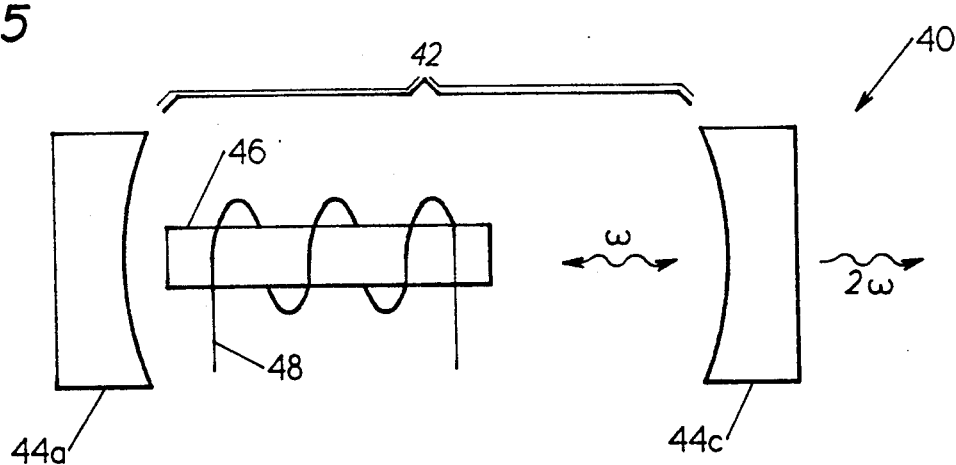
FIG. 5 shows a simplified block diagram of a frequency doubling laser that includes a glass rod prepared in accordance with FIG. 4.

Referring to FIG. 5, after the laser rod 46 has been prepared the output mirror 44b is replaced with a mirror 44c that is 100% reflective at ω and substantially transparent at 2ω. The KTP crystal 50 is removed, and the laser is operated to simultaneously produce 1.06 μm and 532 nm. In that the mirror 44c is substantially transparent to the second harmonic the coherent optical output of the laser is at twice the frequency of the laser rod fundamental frequency. In addition, the efficiency is high since the intracavity field at 1.06 μm is very large.

Of course, it is within the scope of the invention to remove the prepared rod 46 from the cavity 42 and install same within another laser cavity. It is also within the scope of the invention to provide the mirror 44c such that it is partially transmissive to the fundamental frequency, thereby providing both 1.06 μm and 532 nm at the output.

Although described in the context of specific materials it should be realized that the teaching of the invention applies to any bulk glass doped with material to provide SHG when suitably prepared. Furthermore, variations in the apparatus shown in FIG. 1 may be accomplished. For example, the use of the polarizing filter 13 is optional. Also, although a specific embodiment of a device employing the invention is shown and described in FIG. 3, it should be realized that a number of optical devices may employ to advantage the SHG coating of the invention. For example, the laser diode 26 may be replaced by a diode pumped Nd:YAG laser operating at 1.06 μm or 1.32 μm to produce green and red light, respectively. In general, the laser diode 26 may be replaced by any coherent source in the visible-near IR region. Furthermore, a number of wavelengths may be frequency doubled other than those specifically mentioned above. For example, radiation having wavelengths within the range 0.6 μm to 2 μm radiation can be frequency doubled.

Also, for wavelengths below 1.3 μm a UV pre-exposure of Ge glass has been shown to enhance the SHG encoding at 1.06 μm and other wavelengths. The UV pre-exposure has also been found to allow for efficient preparation at significantly lower preparation powers. By example, an argon-ion laser having a wavelength of 350 nm can be employed to pre-expose the Ge glass. This pre-exposure period occurs for, typically, several minutes and employs intensities of the order of 1 KW/cm². The pre-exposure is followed by preparation as described above. It is believed that the UV pre-exposure is advantageous in that the $Ge_2^{(0)}$ defect strongly absorbs radiation having wavelengths within the range of approximately 310 nm to approximately 360 nm.

Thus, while the invention has been particularly shown and described with respect to preferred embodiments thereof, it will be understood by those skilled in the art that changes in form and details may be made therein without departing from the scope and spirit of the invention.

What is claimed is:

1. An optical device for frequency doubling optical radiation, said device having an input for receiving electromagnetic radiation having a first wavelength and an output for outputting electromagnetic radiation that includes electromagnetic radiation having a second wavelength that is one half of the first wavelength, said device including a bulk $SiO_2$ glass that includes a charge transfer dopant, said bulk $SiO_2$ glass being interposed between said input and said output.

2. An optical device as set forth in claim 1 wherein the bulk $SiO_2$ glass is comprised of material selected from the group consisting of $[SiO_2:Ce^{3+}]$, $[SiO_2:Eu^{2+}]$, and $[SiO_2:Nd^{3+}]$.

3. A source of electromagnetic radiation, comprising:
   a substrate;
   first converting means, disposed upon said substrate, for converting electrical energy into electromagnetic radiation, said electromagnetic radiation including a first wavelength, said first converting means having at least one output face for outputting said electromagnetic radiation; and
   second converting means, optically coupled to said output, for converting at least a portion of said electromagnetic radiation into electromagnetic radiation having a second wavelength that is one half of the first wavelength, said second converting means being comprised of substitutionally doped silica that includes a charge transfer dopant.

4. A source of electromagnetic radiation as set forth in claim 3 wherein said second converting means is comprised of a material selected from the group consisting essentially of $[SiO_2:Al/Ce^{3+}]$, $[SiO_2:Al/Eu^{2+}]$, $[SiO_2:Ge/Ce^{3+}]$, $[SiO_2:Ge/Nd^{3+}]$, $[SiO_2:Ge/Ge$ defect], and combinations thereof.

5. A source of electromagnetic radiation as set forth in claim 3 wherein said first converting means includes a laser diode means.

6. A source of electromagnetic radiation as set forth in claim 5 wherein said substitutionally doped silica that includes a charge transfer dopant is disposed upon said substrate.

7. A source of electromagnetic radiation as set forth in claim 3 wherein said substitutionally doped silica that includes a charge transfer dopant is disposed upon said at least one output of said first converting means.

8. An optical data storage readout system, said system comprising a source of electromagnetic radiation for illuminating a storage media having information recorded thereon, said source including first converting means for converting electrical energy into electromagnetic radiation, said electromagnetic radiation including a first wavelength, said first converting means having at least one output force for outputting said electromagnetic radiation, said source further including second converting means, optically coupled to said output, for converting at least a portion of said electromagnetic radiation into electromagnetic radiation having a second wavelength that is one half of the first wavelength, said second converting means being comprised of substitutionally doped silica that includes a charge transfer dopant.

9. A system as set forth in claim 8 wherein said second converting means is comprised of a material selected from the group consisting essentially of $[SiO_2:Al/Ce^{3+}]$, $[SiO_2:Al/Eu^{2+}]$, $[SiO_2:Ge/Ce^{3+}]$, $[SiO_2:Ge/Nd^{3+}]$, $[SiO_2:Ge/Ge$ defect$]$, and combinations thereof.

10. A system as set forth in claim 8 wherein said first converting means includes a laser diode means.

11. A system as set forth in claim 10 wherein said laser diode means is disposed upon a substrate, and wherein said substitutionally doped silica that includes a charge transfer dopant is also disposed upon said substrate.

12. A system as set forth in claim 8 wherein said substitutionally doped silica that includes a charge transfer dopant is disposed upon said at least one output of said first converting means.

* * * * *